United States Patent [19]

Kammiller et al.

[11] 4,204,266

[45] May 20, 1980

[54] INVERTER DRIVE CIRCUIT

[75] Inventors: Neil Kammiller, Lakewood; Pantelis P. Paradissis, Amherst, both of Ohio

[73] Assignee: Lorain Products Corporation, Lorain, Ohio

[21] Appl. No.: 928,864

[22] Filed: Jul. 28, 1978

[51] Int. Cl.² .......................................... H02P 13/18
[52] U.S. Cl. ........................................ 363/98; 363/26; 363/41; 363/132
[58] Field of Search ................................. 363/24–26, 363/41, 97–98, 131–134, 78–79, 95

[56] References Cited

U.S. PATENT DOCUMENTS

| | | | |
|---|---|---|---|
| 3,715,648 | 2/1973 | Kernick et al. | 363/97 |
| 3,768,000 | 10/1973 | Bates | 363/134 X |
| 4,002,963 | 1/1977 | Hunter | 363/41 X |
| 4,051,426 | 9/1977 | Wood | 363/131 |
| 4,099,225 | 7/1978 | Nygaard | 363/98 X |

*Primary Examiner*—J. D. Miller
*Assistant Examiner*—Peter S. Wong
*Attorney, Agent, or Firm*—Louis V. Granger; Michael M. Rickin

[57] ABSTRACT

An inverter drive circuit is disclosed wherein the inverter is a pulse width modulated inverter. The inverter includes a regulator circuit to regulate the width of the pulses which control the conduction of first and second controllable semiconductors in the inverter. The regulator is controlled by the output of the inverter in a feedback arrangement with a current limit circuit as well as an instant current limit to limit the output. A turn-on circuit is utilized to act through a drive transformer to turn on the controllable semiconductors as required. A turn-off circuit acts on the drive transformer and turns off the turn-on signal. A set and reset circuit is provided using first and second drive transformers for first and second controllable semiconductors in the inverter. One transformer is set in order to provide the turn-on and then this transformer is energized in the opposite direction to saturation to obtain a reset. A decoupling diode is provided between the drive transformer and the control electrode of the semiconductor so that when the decoupling diode ceases conduction then reverse voltage developed by the drive transformer is not applied to the control electrode of the semiconductor. The foregoing abstract is merely a resume of one general application, is not a complete discussion of all principles of operation or applications, and is not to be construed as a limitation on the scope of the claimed subject matter.

32 Claims, 14 Drawing Figures

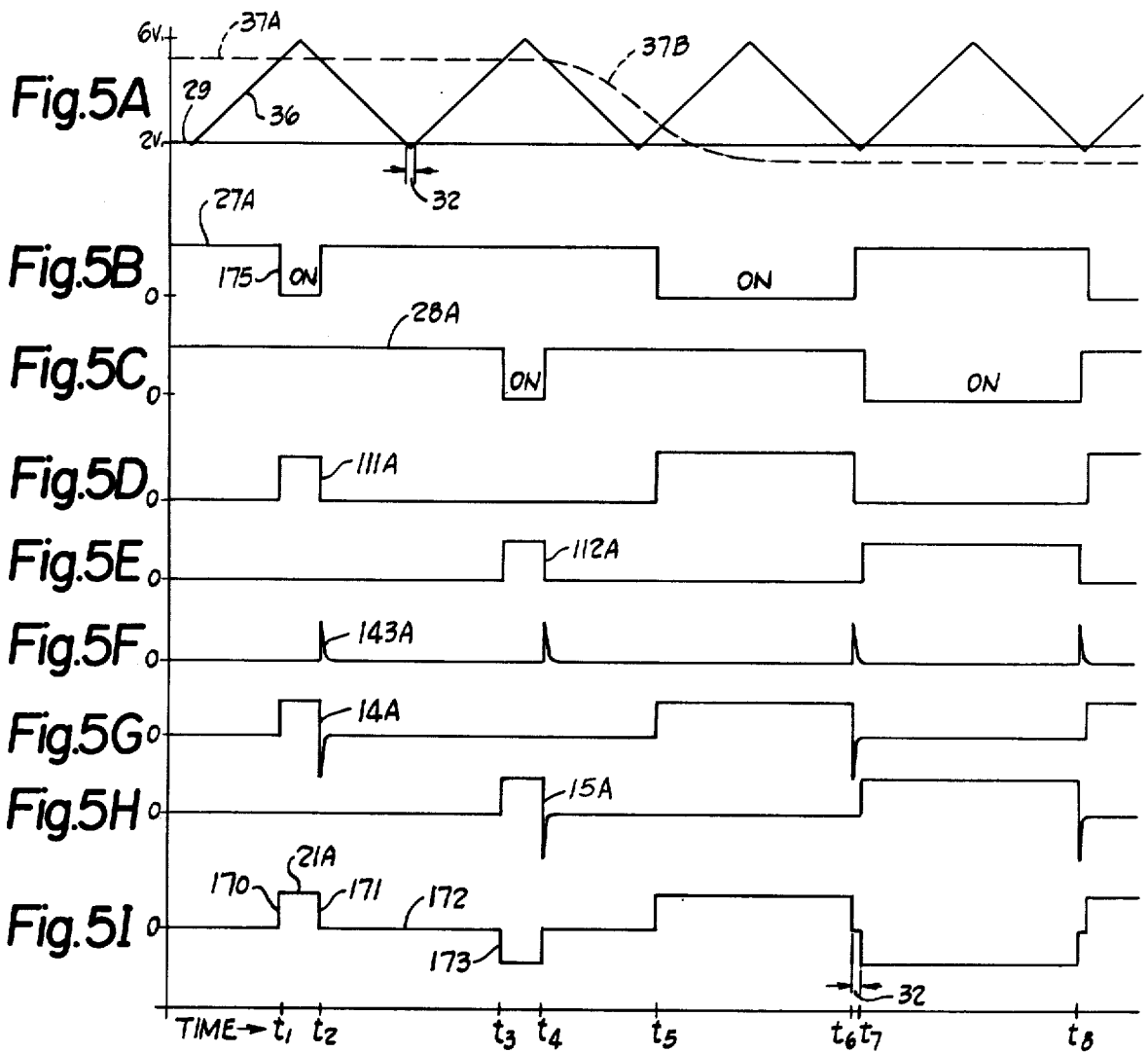
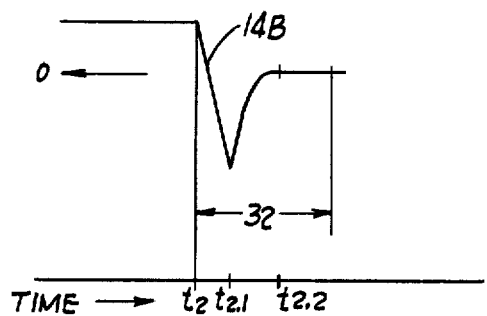
Fig. 6

INVERTER DRIVE CIRCUIT

BACKGROUND OF THE INVENTION

Many inverter circuits have previously been used including those with pulse width modulation to establish variable output power. The prior art has known circuits with feedback from the output of the inverter to control the input drive signal in accordance with some electrical output condition such as voltage or current. The prior art has known a drive transformer used with two alternately conducting semiconductors so that when the drive transformer was energized of one polarity a first semiconductor conducted and when energized in the opposite polarity a second semiconductor in the inverter conducted. The difficulty with such a unit was that the drive transformer had a core material exhibiting a rectangular hysteresis loop and this core material was capable of being saturated. A variable amount of saturation in accordance with variable conduction times, for pulse width modulation, meant that the operation of the circuit was erratic, especially under rapidly changing conditions, being dependent upon the amount of conduction time in the previous cycle because of the variable degree of saturation.

The prior art inverter circuits have also included those of relatively high current carrying capability, but where this has been attempted to be combined with high frequency of operation, the semiconductors used, for example transistors, have been of the type which exhibited a relatively high forward voltage drop yet a relatively low reverse blocking voltage. This has made the operation of such an inverter circuit subject to potential failure if the control voltage on a semiconductor should be too high in the reverse direction. Also such inverter circuits have often been ones wherein it was difficult to achieve a turn-off of a particular semiconductor at the proper time in order to control the width of the pulses in the pulse width modulated inverter. Still further in such prior art inverters, especially during transient conditions, a suddenly applied load might tend to cause the inverter to have a greatly increased output which could overload the current carrying capabilities of the inverter semiconductors.

SUMMARY OF THE INVENTION

The problem to be solved is therefore how to construct a pulse width modulated inverter circuit to overcome these disadvantages of the prior art. This problem is solved by an inverter circuit having controllable semiconductors connected for a controllable output alternating voltage, comprising, in combination; a control circuit connected to control the conduction time of said semiconductors, said control circuit having controllable input means connected to control the conduction time of said semiconductors, means establishing a voltage reference source, means connected to sense the amount of output current from said semiconductors and to develop a current signal, rectifier means having a plurality of outputs connected to rectify a signal proportional to said current signal, a current limit setting potentiometer connected to said reference voltage source to establish a reference voltage, a first current limit means including an operational amplifier connected as a comparator and having first and second inputs; means connecting said comparator first input to one of the outputs of said rectifier means; and means connecting said current limit setting potentiometer reference signal to said second input of said comparator; and means connecting the output of said comparator to said controllable input means of said control circuit whereby the output voltage of said inverter is decreased upon the output of said comparator changing state when said rectified signal exceeds said reference signal.

The invention also contemplates use of an inverter circuit comprising, in combination, at least first and second semiconductors connected for full wave alternating output on output terminals from DC input terminals, a signal source having an alternating signal voltage, first and second drive transformers and first and second capacitors connected to the control electrodes of said first and second semiconductors, respectively, turn-on means connected to be controlled by said signal voltage and connected through said drive transformers to control the alternate conduction of said first and second semiconductors, turn-off means including said first and second capacitors, means associated with said turn-on means and connected to establish a voltage across said first and second capacitors, and said turn-off means connected to be controlled by said signal voltage and connected to apply the voltage of said capacitors to the control electrode of the respective semiconductor in a direction to supply reverse bias thereto to turn off said respective semiconductor.

The invention is also included in an inverter circuit comprising, in combination, at least first and second semiconductors connected for full wave alternating output on output terminals from DC input terminals, a signal source having an alternating signal voltage, first and second drive transformers connected to the control electrodes of said first and second semiconductors, respectively, set means connected to be controlled by said signal voltage and connected through said drive transformers to control the alternate conduction of said first and second semiconductors and to drive said drive transformers to a forward flux level, and reset means connected to be controlled by said signal voltage and connected to said transformers to apply a reset current thereto during the non-conduction period of the respective semiconductor to reset the flux of the core of the transformers to saturation in the opposite direction.

The invention is also contained in an inverter circuit having at least a first controllable semiconductor connected to supply an alternating voltage from DC terminals comprising, in combination; a drive transformer having a secondary, means including a decoupling unidirectional conducting device connecting said secondary to the control electrode of said first semiconductor, turn-on means acting on said drive transformer to cause conduction through said decoupling device to said control electrode to turn on first semiconductor, turn-off means acting on said drive transformer to effectively terminate the turn-on signal on said secondary to terminate conduction of said first semiconductor, and said decoupling device having a recovery time to achieve reverse blocking capability longer than that of said first semiconductor to thus prevent reverse bias being applied on the control electrode of said first semiconductor.

An object of the invention is to provide a pulse width modulated inverter drive circuit which provides for extremely rapid current limit in view of rapidly increasing transient output currents.

Another object of the invention is to provide an inverter circuit with an improved turn-on and turn-off means for controllable semiconductors.

Another object of the invention is to provide an improved inverter circuit with drive transformers controlling the conduction of first and second semiconductors wherein the drive transformers are reset to saturation in the opposite direction between each power pulse of the semiconductors.

Another object of the invention is to provide an improved inverter circuit with a decoupling diode so as to prevent a too high reverse bias being applied on the control electrode of the semiconductor.

Other objects and a fuller understanding of the invention may be had by referring to the following description and claims, taken in conjunction with the accompanying drawing.

BRIEF DESCRIPTION OF THE DRAWING

FIGS. 5 and 6 are graphs of voltage and current pulses in the circuit of FIG. 1.

DESCRIPTION OF THE PREFERRED EMBODIMENTS

Figure 1:
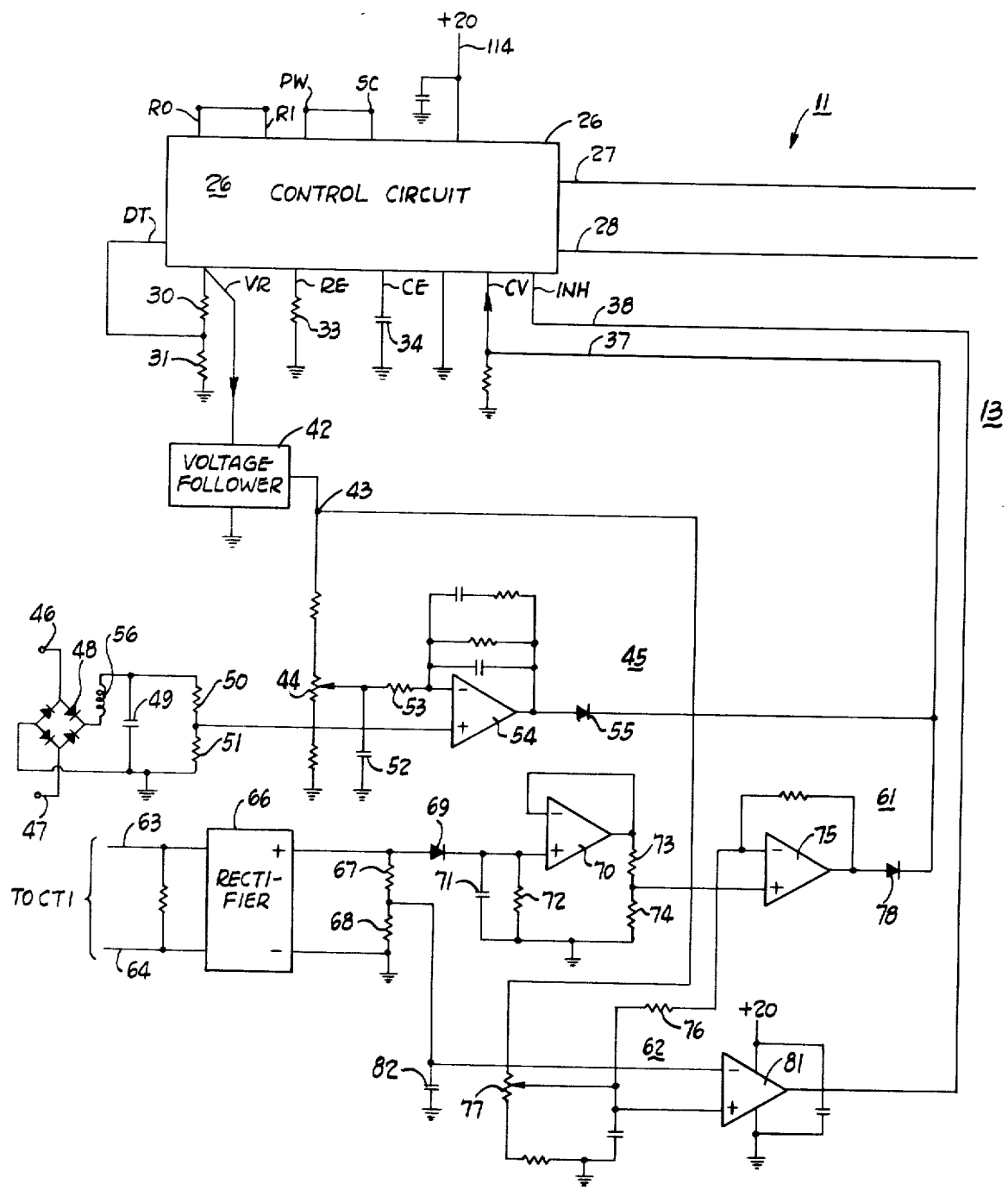
FIG. 1 is a schematic diagram of a part of a drive circuit for an inverter.
Figure 2:
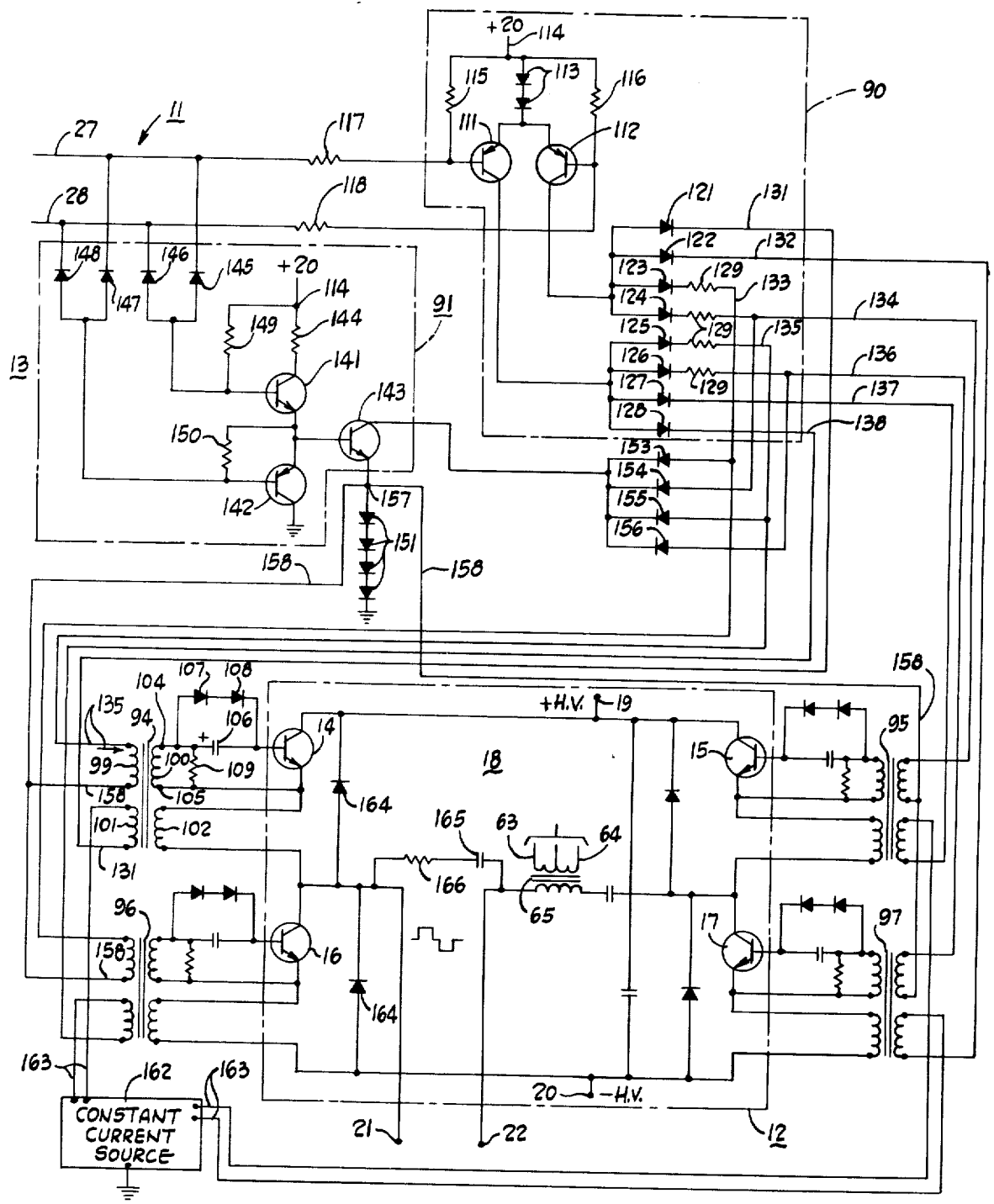
FIG. 2 is a schematic diagram of the remainder of the drive circuit plus the inverter power circuit.

FIGS. 1 and 2, side by side, illustrate an inverter circuit 11 which includes in general an inverter power circuit 12 in FIG. 2 and a drive circuit 13 which generally is the remainder of FIGS. 1 and 2.

The inverter power circuit may include a center tapped transformer or separate decoupled transformers plus first and second controllable semiconductors 14 and 15, or a half bridge with two semiconductors, or it may be a three phase system with at least three controllable semiconductors. However, as shown, the power circuit 12 includes an inverter bridge circuit 18 which includes the first and second controllable semiconductors 14 and 15 as well as third and fourth controllable semiconductors 16 and 17, respectively. In this preferred embodiment of FIG. 1 these semiconductors 14-17 are transistors. The inverter bridge 18 operates from positive and negative DC input terminals 19 and 20, respectively, and has an alternating current output on terminals 21 and 22. The drive circuit 13 controls the inverter bridge 18 such that the first and second transistors 14 and 15 conduct alternately, and since this is a bridge circuit, transistors 14 and 17 conduct simultaneously and transistors 15 and 16 conduct simultaneously. A high frequency switching transistors satisfactory for use in this high voltage, e.g. 300 volts, circuit is a type TIP 563.

A control circuit 26 is connected to regulate the conduction time of the semiconductors 14-17. This control circuit is one which controls the width of the output pulses of this inverter bridge 18.

The control circuit 26 has output lines 27 and 28, and these may be considered a signal source to control the conduction times of the first through fourth semiconductors 14-17. The control circuit 26 may be a commercially available controller such as Motorola part number MC 3420, and has alternate output pulses on the output lines 27 and 28, as shown by the graphs of voltages 27A and 28A on FIGS. 5B and 5C, respectively. These pulses are a logic zero or low condition from a normally high output. The control circuit 26 has a variable width of these pulses, in order that the drive circuit 13 will provide a variable conduction time of the semiconductors 14-17. The width of these pulses as shown in the graph 27A and 28A cannot be made so wide that the pulses intersect or overlap, instead there is a minimum deadtime 32 as shown in FIG. 5A. This is established by a deadtime voltage 29 which intersects the triangular wave form 36 shown in this FIG. 5A. The triangular wave form is caused by an internal oscillator which, in this embodiment, causes a ramp up voltage from 2.0 volts and then a ramp down voltage from 6.0 volts. Resistors 30 and 31 are connected between a voltage reference terminal VR and ground, and the junction of these resistors is connected to a deadtime adjust terminal DT in order to set the length of this minimum deadtime 32.

The frequency of oscillation is set by a resistor 33 connected between a terminal RE and ground and also set by a capacitor 34 connected between a terminal CE and ground. The control circuit has controllable input means on conductors 37 and 38. Conductor 37 is connected to input terminal CV and conductor 38 is connected to inhibit terminal INH.

The control circuit 26 has the ability to control the width of the pulses on the output terminals 27 and 28. From a review of FIG. 5A, one will note that if the value of the control voltage on the conductor 37 is decreased, then the control voltage 37A intersects more of the tip of the triangular wave 36 and hence this would increase the width of the output pulses. The control voltage 37A is shown as making a sharp decrease at the location 37B to a low level below the triangular wave form 36 in order to illustrate a maximum output condition of the inverter drive circuit 13. If the normally high voltage on the inhibit terminal to which conductor 38 is connected goes low, then this forces the output on the output lines 27 and 28 to go high.

The control circuit terminal VR is a constant voltage reference from the internally generated voltage reference signal and this is applied through an optional voltage follower circuit 42 in order to increase the power capabilities of this constant voltage reference. The voltage follower circuit 42 has an output terminal 43 with a low impedance and this is supplied through a potentiometer 44 to ground. The potentiometer 44 supplies a controllable reference voltage to an output voltage regulator circuit 45. Terminals 46 and 47 are connected to all or preferably a portion of the output of the inverter at the AC output terminals 21 and 22. This voltage is rectified by rectifier 48 and filtered by an inductor 56 and by a capacitor 49 in parallel with resistors 50 and 51. The inductor input filter senses the average voltage rather than peak voltage across the output terminals 21 and 22. The wiper of the potentiometer 44 is connected to ground through a capacitor 52 and is also connected through a resistor 53 to the inverting terminal of a comparator 54. The non-inverting terminal of the comparator is connected to the junction of resistors 50 and 51. The voltage at the junction of resistors 50 and 51 is a positive voltage which normally slightly exceeds the voltage from the wiper of potentiometer 44. As a result the comparator 54 normally has a small positive voltage output. This might be about +5 volts, for example, as shown in the control voltage 37A of FIG. 5A. If the output voltage increases somewhat, for example, as caused by a decreased load current, this will increase the error signal which is the output of comparator 54 and this is passed by a diode 55 onto conductor 37 and the control voltage terminals CV. As shown in FIG. 5A an increase in the voltage 37A will narrow the width of the pulse output on the conductors 27 and 28, and as shown on the curves 27A and 28A of FIGS. 5B and 5C. This reduces the output voltage of the inverter power circuit 12 to return the inverter output to a stable condition.

The inverter drive circuit 13 also includes first and second current limit circuit 61 and 62. The first current limit circuit 61 has an input on terminals 63 and 64. These terminals are shown in FIG. 2 as being the output from a current transformer 65 connected in the output leads of the inverter bridge circuit 18. This current signal on the input terminals 63 and 64 in FIG. 1 is supplied to a rectifier 66, and the rectified signal is supplied to a pair of voltage divider resistors 67, 68 and then through a diode 69 to the non-inverting input of an amplifier connected as a voltage follower 70. On the non-inverting input of voltage follower 70 a peak charging circuit is provided which includes a small capacitor 71 in parallel with a resistor 72 to ground. In one practical circuit constructed in accordance with the invention, the capacitor 71 was 0.1 microfarads and the resistor 72 was 220,000 ohms. Such a combination means that the small capacitor 71 is quick to charge with a sudden increase in load current and the relatively high resistance of resistor 72 means that the capacitor 71 is relatively slow to discharge. Under these conditions, the peak charging circuit is stable and does not readily pass any AC signal therethrough, but instead follows the peak of the incoming current limit signal.

The output of the voltage follower 70 is supplied to resistors 73 and 74 and the junction thereof supplies an output to the non-inverting input of an op-amp 75 connected as a comparator. This op-amp has the inverting input connected through a resistor 76 to the wiper of a potentiometer 77 which is connected to the voltage reference source at terminal 43. The setting of the wiper on the potentiometer 77 sets the value of the current limit and this is normally set at a higher magnitude of voltage on the inverting input of op-amp 75 than the output on the non-inverting input thereof from the voltage follower 70. Accordingly, upon an increase in current output of the inverter bridge circuit 18 such that the signal on the non-inverting input of op-amp 75 exceeds that reference current limit point on the inverting input, the normally negative output of op-amp 75 changes to a positive output and this is passed through a diode 78 to the conductor 37. This increasing positive signal acts, as will be seen in FIG. 5A, to decrease the width of the output pulse and hence decrease the output of the inverter bridge circuit 18. Accordingly, current limiting is effected.

The second current limit circuit 62 includes a comparator 81 which has the non-inverting input thereof connected to the same wiper of potentiometer 77 so that it is controlled by the same current limit point as the first current limit circuit 61. The inverting input of the comparator 81 is connected to the junction of resistors 67 and 68 to receive the current limit signal from rectifier 66. A capacitor 82 is connected to ground from this inverting input. Normally the voltage at the non-inverting input exceeds the magnitude of the voltage at the inverting input of comparator 81 and both are positive voltages so that the output of comparator 81, connected to conductor 38, is normally positive. The capacitor 82 is a very small value capacitor, for example, in one practical circuit embodying the invention this was 100 picofarads. As a result this second current limit circuit 62 is an extremely rapidly operating circuit. Should the current output of the inverter bridge circuit 18 suddenly increase, for example, as in a short circuit, then this second current limit circuit 62 acts much more rapidly than the first current limit circuit 61.

In the first circuit 61 the capacitor 71 must charge before that first circuit 61 can act and a typical response time might be 50 microseconds. In the second current limit circuit 62, since the capacitor 82 is a very small capacitor, the response time might typically be two to five microseconds. This would be less than one cycle of operation at the frequency of the regulator circuit which might be anywhere from 2 KHZ to 100 KHZ. Upon this rapidly increased current output from the inverter, e.g. from a short circuit, the inverting input on comparator 81 would exceed that of the non-inverting input to reverse the output thereof causing it to go from a positive or logic one condition to a low or logic zero condition. This low on the inhibit terminal INH of the control circuit 26 immediately forces the output on both lines 27 and 28 to go high to cause cessation of all output of the inverter bridge circuit 18. Thus the extremely rapid operation of the second current limit circuit 62 is used to protect the entire inverter circuit 11 from damage and especially to protect the semiconductors 14–17 from burning out. It also permits the various components to be of a smaller power capability rating than would otherwise be the case. For example, not only the transistors 14–17 may be smaller in current rating, but other components carrying power thereafter may be smaller. For example, the output terminals 21 and 22 may supply some form of a rectifier. The components therein also may be made smaller in current carrying capacity because of the protection afforded by the very rapid action of the second current limit circuit 62.

In the first current limit circuit 61 the voltage follower 70 has the advantage of having a satisfactory voltage output to drive the resistors 73 and 74, yet it has a high input impedance so that it does not load the resistor 72 and capacitor 71. Accordingly, the time constant of resistor 72 and capacitor 71 will not be affected.

The error signal from comparator 54 is shown above to be that which controls the width of the pulses on the output lines 27 and 28 of the control circuit 26 and hence the width of the pulses which form the output of the inverter bridge circuit 18. The drive circuit 13, see FIG. 2, does control the conduction time periods of the transistors 14–17 and the drive circuit 13 includes a turn-on circuit 90 and a turn-off circuit 91.

The turn-on circuit 90 acts through first through fourth drive transformers 94–97 each connected in association with the first through fourth controllable semiconductors 14–17, respectively. The turn-on circuit 90 controls the set and reset of these transformers 94–97. These transformers may be ones with a substantially rectangular hysteresis loop so that the magnetizing current of the transformers is extremely small and therefore in effect the transformers are essentially transparent, merely giving a transformation of voltage and current in accordance with the turns ratio. A feature of the present invention is that a separate drive transformer is used for each of the controllable semiconductors 14–17, rather than the common prior art practice of one transformer for a pair of alternately conducting semiconductors. The drive transformers are substantially identical and in general only the transformers 94 and its associated circuitry with the first semiconductor 14 will be described in detail. The transformer 94 has a primary winding 99, a secondary winding 100, a reset winding 101 and a regenerative winding 102.

The turn-on circuit 90 acts through a drive transformer to the respective semiconductor. In the case of the first transformer 94 and first semiconductor 14, it acts through the secondary 100 and what may be termed a bias circuit to a control electrode of this semiconductor 14. The semiconductor is shown as an NPN transistor having base drive. The secondary 100 has terminals 104 and 105 with terminal 104 connected through a capacitor 106 to the base of the transistor 14. This capacitor is a part of the turn-off means. Bias means is connected across the capacitor 106 and in the preferred embodiment this bias means is an impedance which limits the voltage across the capacitor 106. This impedance in the preferred embodiment is a plurality of diodes 107 and 108 which are poled to conduct current from terminal 104 to the base of transistor 14. A resistor 109 is connected across the secondary 100. The collector of transistor 14 is connected to the positive DC terminal 19 and the emitter of transistor 14 is connected through the regenerative winding 102 to the collector of the next transistor in the bridge circuit 18, transistor 16, and is also connected to the AC output terminal 21.

The turn-on circuit 90 includes first and second turn-on transistors 111 and 112 shown in this preferred embodiment as being PNP type with the emitters connected together and through diodes 113 to a positive supply voltage at terminal 114. This positive supply voltage terminal 114 is connected through resistors 115 and 116 to the output lines 27 and 28, respectively, from the control circuit 26. This connection makes these lines normally high, until driven low by the pulse output on the respective line from the control circuit 26. Resistors 117 and 118 are connected in these lines 27 and 28, respectively, to convey the signal on lines 27 and 28 and to provide a proper current to the bases of the transistors 111 and 112. The collector of transistor 112 is connected to the anodes of a group of diodes 121–124 and the collector of transistor 111 is connected to the anodes of a group of diodes 125–128. Current limiting resistors 129 are individually connected to the cathodes of the diodes 123–126, respectively. Conductors 131–138 are connected to the cathodes of the diodes 121–128, respectively, with the resistors 129 interposed in such connection with respect to the diodes 123–126. These conductors 131–138 are connected to the various terminals on the primary windings and reset windings of the pulse transformers 94–97.

The turn-off circuit 91 includes first, second and third transistors 141, 142 and 143, respectively. The collector of NPN transistor 141 is connected through a resistor 144 to the positive supply terminal 114. The emitter of this transistor is connected to the emitter of PNP transistor 142, the collector of which is grounded. The base of the transistor 141 is connected through a diode OR circuit or gate formed by diodes 145 and 146 with the anodes connected to the base of transistor 141 and the cathodes connected to the output lines 27 and 28, respectively. The base of the transistor 142 is connected through another diode OR circuit consisting of diodes 147 and 148 to the output lines 27 and 28, respectively. A resistor 149 connects the positive supply voltage terminal to the base of transistor 141 and a resistor 150 connects the emitter of transistor 142 to the base thereof. This emitter is also connected to the base of the NPN transistor 143 with the emitter of this transistor connected through a plurality of biasing diodes 151 to ground. The collector of transistor 143 is connected through a diode OR circuit consisting of a group of diodes 153–156. The anodes of the diodes 153–156 are connected to the conductors 133–136, respectively. The emitter of transistor 143, in addition to being connected through the biasing diodes 151 to ground, is also connected to a clamping terminal 157 which in turn is connected by clamping conductors 158 to the lower terminal of each of the primaries on the transformers 94–97, such as primary winding 99.

A constant current source 162 is used in the preferred embodiment as a current source for the reset windings such as winding 101 on transformer 94. This constant current source is connected by conductors 163 to the upper end of the reset windings on each of the transformers 94–97 and this constant current source is also connected to ground. Protective diodes 164 are connected across the series combination of each of the transistors 14–17 and its regenerative winding, such as winding 102, in order to limit the reverse voltage applied to the respective transistors. A transient supressing capacitor 165 and resistor 166 are connected in series across the AC output terminals 21 and 22.

Operation

The output lines 27 and 28 from the control circuit 26 may be considered a signal source having an alternating signal voltage. As shown in FIGS. 5B and 5C, this alternating signal voltage is actually alternating pulses and the pulses are of variable width in order to control the conduction times of the semiconductors 14–17. FIG. 5 is a diagram of graphs of various portions of the circuit with FIG. 5D showing a graph 111A of the current conducted by transistor 111, and with FIG. 5E showing a graph 112A of the current conducted by the transistor 112. Transistor 143 may be considered a clamping transistor and FIG. 5F shows a graph 143A of the current conducted by this clamping transistor 143. FIG. 5G shows a graph 14A of the base current conducted by the transistor 14 and FIG. 5H shows a graph 15A of the base current conducted by transistor 15. FIG. 5I is a graph 21A of the output voltage appearing at the output terminals 21, 22. This is for the particular case of a resistive load, or the case of a load consisting of a rectifier and an inductive input filter. Referring to this graph 21A there is a sequence of three different operations for each transistor in one alternating current cycle. The first step is shown by the rising wave front 170 which is caused by the set of the transformer 94 and practically simultaneous turn-on of the respective transistor. The second step in the sequence is the turn-off of the respective transistor shown by the falling wave front 171. This is accomplished by the clamp established on the transformer 94 and this occurs during the horizontal portion 172 of the output voltage curve between positive and negative pulses. The third step in the sequence is the reset of the respective transformer 94 which occurs during the conduction period of the opposite transistor 15.

In more detail, the set of the particular transformer will be described with respect to the first transformer 94. The signal source on the control circuit lines 27 and 28 controls the turn-on of the transistors 14–17. At the time that the output line 27 goes low, as shown at portion 175 of graph 27A, this turns on transistor 111 because the base thereof goes low. Conduction of transistor 111 goes through the diode 125 and resistor 129 to conductor 135. This makes current flow in what will be termed the forward direction in the primary winding 99. This sets the transformer core. The transformer is not driven to forward saturation, instead, the flux level is partially changed from the flux level at reverse saturation condition, enough so that the secondary winding 100 emits a pulse out of the terminal 104 which is passed by the diodes 107 and 108 to the base of the transistor 14. This turns on this transistor almost simultaneously with the beginning of the set of the core of the first transformer 94.

FIGS. 5B through 5I show that at time $t_1$ the control circuit output line 27 has a low output pulse, the transistor 111 turns on, the transistor 14 turns on, and the output of the entire inverter circuit 11 has a positive going output pulse, due to conduction of both transistors 14 and 17.

The pulse from transistor 111 into the primary winding 99 continues, but it is not necessary in this particular circuit because of the regenerative winding 102. As soon as the transistor 14 begins to conduct, then current flows through the regenerative winding 102 to supply current from the secondary winding 100 to keep transistor 14 turned on. This current flows through the bias means which is the diodes 107 and 108 and this will charge the capacitor 106 so that it is positive on the left side as viewed in FIG. 2. It will be noted that transistor 17 is also turned on by a similar action of turn-on of transistor 111 acting through diode 126 and resistor 129 to supply the initial pulse to the fourth transformer 97 and turn on transistor 17. This energizes the two transistors 14 and 17 in the inverter bridge circuit 18 so that an output voltage is supplied to the terminals 21 and 22.

At time $t_2$ in FIG. 5, the output pulse on the control circuit output line 27 ceases and this line 27 goes back to a logic high condition. The diode OR circuit 145–148 responds to the change in the pulse and controls the turn-off circuit 91. Since both lines 27 and 28 are high, this turns off the transistor 142 and turns on transistors 141 and 143. The conduction of this transistor 143 establishes a clamp or effective short circuit across all of the drive transformers 94–97. To consider first the transformer 94, the current through transistor 143 goes through the clamping conductors 158 to the lower end of the primary winding 99, travels upwardly through this winding, back through the conductor 135 and the diode 155 to the collector of the transistor 143.

The capacitor 106 has previously been charged, during the turn-on of transistor 14, so that it is positive on the left side thereof, as viewed in FIG. 2. The voltage across capacitor 106 will be limited by the two diodes 107 and 108. If these are silicon diodes, the voltage will be about 1.4 volts. This voltage on the capacitor is transformed by the transformer from the winding 100 to the winding 99 and this provides the voltage causing current flow through the transistor 143. Transistor 143 in combination with diode 155 forms a low impedance circuit which provides an effective short circuit on the transformer winding 99, which in turn is transformed to the winding 100. Thus even though the voltage on the capacitor 106 is a small voltage, e.g. 1.4 volts, this is applied in the reverse direction to the forward or turn-on current, hence this is a reversely applied bias on the base-emitter of the transistor 14 as shown in FIG. 5G, to turn off this transistor. This reverse current removes the stored charge of this transistor 14 and thus turns it off. During this same time interval, the regenerative winding 102 is by transformer action short circuited by transistor 143 and diode 155 to eliminate the regenerative effect thereof.

The FIG. 5 shows that at time $t_2$ the control circuit output line 27 goes high, the transistor 111 turns off, the transistor 143 turns on, the transistor 14 turns off, and the output voltage of the inverter bridge 18 goes to zero. The clamp function on the transformer 94 starts at time $t_2$ and continues as long as clean out or removal current is flowing from the base of the transistor 14. This is shown as a small pulse of current 143A in FIG. 5F. This clamp is maintained, without any substantial current flow, until time $t_3$ when the control circuit output line 28 goes to an on condition; namely, goes low as shown in FIG. 5C. This is the start of the reset function of transformers 94 and 97.

At the time $t_3$, because line 28 goes low, the diode OR circuit 145–148 causes transistor 142 to conduct and transistors 141 and 143 to cease conduction. FIG. 5E shows that transistor 112 now conducts and conducts current through all the diodes 121–124. That current through diode 124 sets the second drive transformer 95 and turns on the transistor 15. That current through diode 121 travels through conductor 131 to the lower end of the reset winding 101 on the first drive transformer 94. This current travels upwardly through this reset winding, as viewed in FIG. 2, then through the constant current source 162 to ground. Since this is in a direction opposite to the previously mentioned forward direction of current in the primary winding 99, this resets the flux in the core of the first drive transformer 94 to a saturated condition in the reverse direction. This makes sure that this transformer is fully saturated in the reverse direction ready to again be set to turn on the transistor 14 at time $t_5$ as shown in FIG. 5. Current through the diode 122 from the transistor 112 resets the fourth drive transformer 97 in a manner similar to reset of the first drive transformer 94. It will be noted that the resistors 129 limit the set current or turn-on current to the primary winding and that the constant current source 162 controls the reset current. The reset voltage may be made large for a positive reset of the transformer no matter how short the reset time available.

At the time $t_4$ the clamping action of transistor 143 is again reestablished on the first and fourth drive transformers 94 and 97. In this case it does not perform any function on these transformers because the capacitor 106 has now been discharged. However, this clamp does perform a function on the second and third drive transformers 95 and 96, because the associated transistors have previously been conducting and the capacitors associated therewith, similar to capacitor 106, have previously been charged and are now supplying a voltage for this charge removal function.

Starting at time $t_5$, FIG. 5 shows the condition of maximum conduction periods for maximum output of the inverter bridge circuit 18. In this case the deadtime, shown in FIG. 5I, is the minimum deadtime 32.

The constant current source 162 is connected in the circuit for the reset of each of the drive transformers 94–97. This may be considered a constant current sink because the positive supply voltage at terminal 114 passes through transistor 112 for example, diode 121, and passes upwardly through the reset winding 101 and then through the constant current sink to ground. This establishes constant current on each drive transformer reset winding during reset conditions.

Figure 3:
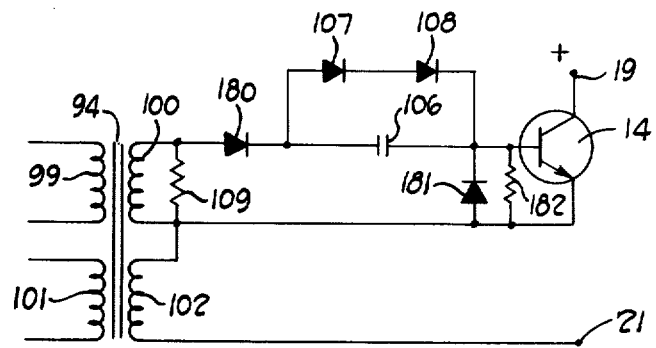
FIG. 3 is a schematic diagram of a modified bias circuit for the semiconductors.

FIG. 3 is a schematic diagram of a modified bias circuit for use with the transistors 14–17. FIG. 3 shows only the transistor 14 and identical circuits would be used with the other transistors 15–17. Again the first drive transformer 94 is shown with its windings 99, 100, 101, and 102. The change from the circuit shown in FIG. 2 is the addition of a decoupling unidirectional conducting device; namely, a diode 180 and also a protective diode 181. A resistor 182 is connected between base and emitter to provide a path for collector-base leakage current. The decoupling diode is connected in the bias circuit poled in the same direction as the bias diodes 107, 108. The criterion for the decoupling diode 180 is that it have a longer recovery time to achieve reverse blocking capability than that of the base-emitter diode of the transistor 14. Diode 181 prevents excessive reverse bias being applied on the base-emitter of this transistor 14. The circuit of FIG. 3 has an advantage where large currents and high frequency conditions are encountered. In one practical circuit the inverter was supplying low voltage and high current at a frequency of about 20 kilohertz with five volts output and 150 amperes being supplied to the AC output terminals 21 and 22. Under such conditions a transistor is required which has high current conducting capabilities and capable of being switched at high frequencies. A high frequency switching transistor to control this value of current is a type 2N6277 transistor.

The transistors currently commercially available for such operating conditions have a fairly large forward base voltage drop, e.g. as much as 3.5 volts and a relatively low reverse blocking voltage, e.g. five volts. When one considers that transient voltage spikes may occur, it is very difficult to assure proper operation of the transistor without possibility of failure due to exceeding the reverse voltage limitations. It will be recalled that the application of reverse voltage occurs because of the turn-off and even more because of the reset of the drive transformer. During turn-off there was a clamp applying a reverse voltage on the base-emitter of the transistor 14 in order to cause it to cease conduction. This voltage came from the capacitor 106. An even larger reverse voltage is applied during reset conditions when the reset winding 101 is energized. Now in FIG. 3, rapid resetting of the core of the drive transformer results in a large voltage on all the windings of the associated drive transformer. Because of the addition of the decoupling diode 180, any reverse voltage on the secondary 100, which is established during reset condition, is absorbed across the decoupling diode 180, and hence no large reverse bias is applied across the base-emitter of transistor 14. The protective diode 181 is also in the circuit to bypass any large reverse bias voltages applied on the base-emitter of transistor 14 before diode 180 stops conducting, limiting such reverse voltages to the forward voltage drop of this diode 181, e.g. 0.7 volts.

As stated above, the criterion for the decoupling diode 180 is that is should have a recovery time longer than that of the transistor 14. The decoupling diode is therefore normally considered a slow diode, that is, slow to recover reverse blocking capability, although this need not necessarily be the case, it may be rather rapid so long as it is one which has a longer recovery time than that of the transistor 14.

FIG. 6 illustrates the operation of the circuit of FIG. 3 on a time base expanded relative to that of FIG. 5. The time base in FIG. 6 has been expanded such that the time between $t_2$ and $t_{2.1}$ is less than two microseconds for a typical turn-off of a transistor 14. This FIG. 6 shows the same $t_2$ as in FIG. 5 immediately above. The minimum deadtime 32 has been shown as being much longer, because of the expanded time base scale. At the time $t_2$ the graph 14B of the current passed by transistor 14 starts to decrease toward zero and passes on through zero to a time $t_{2.1}$ at which time the transistor 14 turns off due to the reversely applied voltage from the discharging capacitor 106. The diode 180 is still conducting, now in the reverse direction, until a time $t_{2.2}$ whereat the conduction of this decoupling diode 180 ceases. The current is now zero and remains at zero through the remainder of the minimum deadtime 32.

This illustrates another advantage of using the decoupling diode 180. The reset time for resetting each of the drive transformers may be made very short, for example, only a few microseconds. This may be accomplished by applying a large current on the reset winding in order to reset the core to the negative saturation condition. Despite any large voltage appearing on the reset winding and hence on the secondary 100, the decoupling diode absorbs this voltage thereacross and prevents it being applied as a reverse bias on the base-emitter of the transistor 14.

Figure 4:
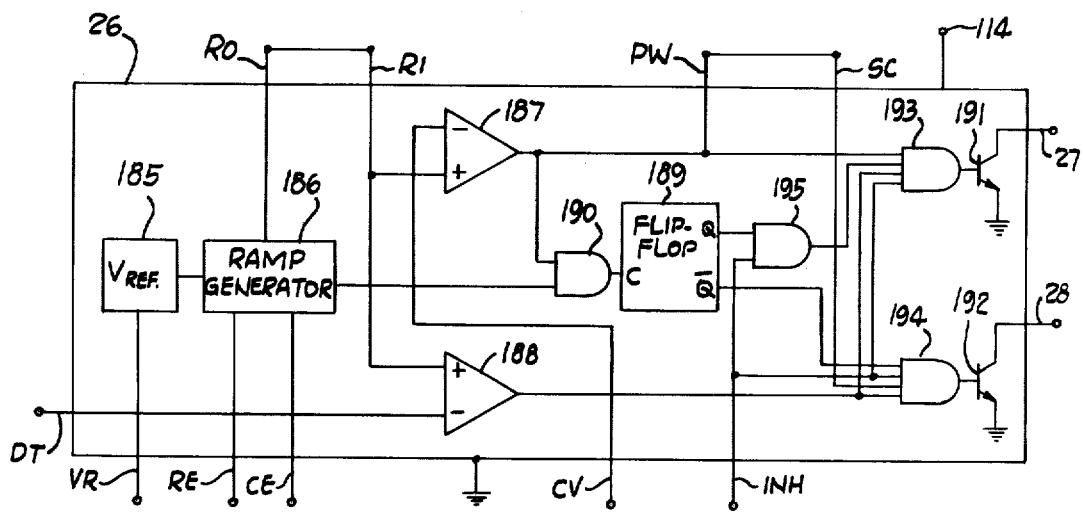
FIG. 4 is a schematic diagram of a circuit usable in the control portion of the drive circuit of FIG. 1.

FIG. 4 illustrates an equivalent circuit for the control circuit 26 which may be a Motorola MC 3420 circuit. An internal voltage reference is generated by a reference source 185 operating from a supply voltage input at terminal 114. This is used internally and is also available at the voltage reference terminal VR in order to set the minimum deadtime 32, see FIGS. 5A and 5I, at the deadtime adjust terminal DT. A ramp generator 186 produces a symmetrical triangular wave form ramping up and down between two fixed limits, e.g. 2.0 volts and 6.0 volts. The frequency is determined by an external resistor connected to the RE terminal and by an external capacitor connected to the CE terminal. The output of the ramp generator 186 is available externally at an RO terminal and this is connected externally to a ramp in terminal RI. This terminal leads to a PWM comparator 187 which compares the triangular wave form with the control voltage on the terminal CV. This comparator 187 thus has a positive pulse voltage for the length of time that the triangular wave form exceeds the control voltage. Therefore this controls the pulse width or the duty cycle.

A deadtime comparator 188 compares the triangular wave form with the smaller voltage available on the deadtime terminal DT. This is the deatime voltage 29 as shown in FIG. 5A and controls the amount of the minimum deadtime 32. A phase splitter is included to obtain two 180° out-of-phase outputs in order to control the two transistors 14 and 15. This phase splitter consists of a toggle flip flop 189 with the clock signal supplied through an AND gate 190 from the outputs of the comparator 187 and the ramp generator 186. The output lines 27 and 28 are fed by NPN transistors 191 and 192, respectively, so that when turned on the output line is low. The output from the PWM comparator 187 is available on a terminal PW and this is externally connected to a symmetry correction terminal SC. Four-input AND gates 193 and 194 supply the transistors 191 and 192, respectively, and permit base drive of these transistors only when the triangular wave form exceeds the control voltage, when the deadtime comparator has a high output, and when the flip flop Q output is high. The inhibit signal must also be high in order to have an output on either of the two output lines 27 and 28, and this is controlled by an AND gate 195.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. An inverter circuit having controllable semiconductors connected for a controllable output alternating voltage, comprising, in combination:
    a control circuit connected to control the conduction time of said semiconductors, said control circuit having controllable input means connected to control the conduction time of said semiconductors;
    means establishing a voltage reference signal;
    means connected to sense the amount of output current from said semiconductors and to develop a current signal;
    rectifier means having a plurality of outputs connected to rectify a signal proportional to said current signal;
    a current limit setting potentiometer connected to said reference voltage signal to establish a reference signal representative of a maximum value of inverter output current;
    a first current limit means including
    (i) an operational amplifier connected as a comparator and having first and second inputs;
    (ii) means connecting said comparator first input to one of the outputs of said rectifier means; and
    (iii) means connecting said current limit setting potentiometer reference signal to said second input of said comparator; and
    means connecting the output of said comparator to said controllable input means of said control circuit whereby the output voltage of said inverter is decreased upon the output of said comparator changing state when said rectified signal exceeds said reference signal.

2. An inverter circuit as set forth in claim 1, including capacitor means connectively coupled to said one of the outputs of said rectifier means to quickly charge upon increase of said current signal, and means connecting the output of said capacitor means to said first input of said comparator.

3. An inverter circuit as set forth in claim 2, including a large value resistance connected in parallel with said capacitor means to provide a slow discharge of said capacitor means.

4. An inverter circuit as set forth in claim 2, including diode means connected to pass the voltage at said one output of said rectifier means to said capacitor means,
    and second current limit means including a comparator connected to another of the outputs of said rectifier means and connected to said control circuit to control same with a response time substantially less than that of said first current limit means.

5. An inverter circuit as set forth in claim 4, wherein said controllable input means includes an inhibit input connected to terminate output of said semiconductors upon the inhibit input changing logic states,
    and means connecting the output of said comparator included in said second current limit means to said inhibit input.

6. An inverter circuit as set forth in claim 1, including capacitor means connected to said one of the outputs of said rectifier means to quickly charge upon increase of said current signal,
    and a voltage follower connected to follow the voltage of said capacitor means and having the output thereof connected to said first input of said comparator.

7. An inverter circuit as set forth in claim 1, wherein said reference voltage is connected to said second input of said comparator,
    and the output of said rectifier means is connected to said first input so that the output of said comparator changes logic states upon said rectified signal exceeding said reference voltage.

8. An inverter circuit comprising, in combination, at least first and second semiconductors connected for full wave alternating output on output terminals from DC input terminals,
    a signal source having an alternating signal voltage,
    first and second drive transformers and first and second capacitors connected to the control electrodes of said first and second semiconductors, respectively,
    turn-on means connected to be controlled by said signal voltage and connected through said drive transformers to control the alternate conduction of said first and second semiconductors,
    turn-off means including said first and second capacitors,
    means associated with said turn-on means and connected to establish a voltage across said first and second capacitors,
    and said turn-off means connected to be controlled by said signal voltage and connected to apply the voltage of said capacitors to the control electrode of the respective semiconductor in a direction to supply reverse bias thereto to turn off said respective semiconductor.

9. An inverter circuit as set forth in claim 8, wherein said turn-off means includes gate means connected to said alternating signal voltage.

10. An inverter circuit as set forth in claim 8, wherein said turn-on means includes first and second turn-on transistors connected to supply a voltage in accordance with said signal voltage to a primary of each of said drive transformers.

11. An inverter circuit as set forth in claim 8, wherein said drive transformers are square loop transformers and supply a signal to the respective semiconductors to establish conduction thereof.

12. An inverter circuit as set forth in claim 8, wherein said means associated with said turn-on means includes bias means connected in parallel with said capacitors,
    said bias means conducting voltage to the control electrode of the respective semiconductor during turn-on of the semiconductor,
    and said bias means establishing the voltage across said capacitors for said turn-off means.

13. An inverter circuit as set forth in claim 12, wherein said bias means includes at least one diode for unidirectional current flow therethrough.

14. An inverter circuit as set forth in claim 8, wherein said means associated with said turn-on means includes unidirectional conducting means to establish current flow to the control electrode of the respective semiconductor for turn-on thereof, said unidirectional conducting means establishing a voltage across said capacitors.

15. An inverter circuit as set forth in claim 8, wherein said signal source includes first and second output conductors,
said alternating signal voltage comprising alternate pulses on said output conductors,
and said turn-off means being connected to said output conductors to be responsive to the incidence of an absence of pulses on both said output conductors.

16. An inverter circuit as set forth in claim 8, wherein said turn-off means includes a turn-off transistor connected to said signal source and connected to be rendered conducting upon the incidence of an absence of signal voltage from said signal source.

17. An inverter circuit as set forth in claim 16, wherein said turn-off transistor is connected to a winding on the respective transformer to effectively short circuit said winding upon conduction of said turn-off transistor.

18. An inverter circuit as set forth in claim 17, wherein the short circuit on a particular transformer winding is reflected to the secondary thereof,
and said secondary being connected to the control electrodes of said first and second semiconductors, respectively, as part of said turn-on means.

19. An inverter circuit as set forth in claim 18, wherein said capacitors are connected in circuit with said secondary to supply a reverse bias to the respective semiconductor upon the effective short circuit on the respective transformer secondary.

20. An inverter circuit comprising, in combination, at least first and second semiconductors connected for full wave alternating output on output terminals from DC input terminals,
a signal source having an alternating signal voltage,
first and second drive transformers connected to the control electrodes of said first and second semiconductors, respectively,
set means connected to be controlled by said signal voltage and connected through said drive transformers to control the alternate conduction of said first and second semiconductors and to drive said drive transformers from a first saturated flux level to a second flux level,
and reset means connected to be controlled by said signal voltage and connected to said transformers to apply a reset current thereto during the non-conduction period of the respective semiconductor to reset the flux of the core of the transformers to said first flux level.

21. An inverter circuit as set forth in claim 20, wherein said reset means includes a reset winding on each of said transformers,
and said reset means supplies current to each of said reset windings to drive the flux in the core of the respective transformer to said first flux level to reset said transformer.

22. An inverter circuit as set forth in claim 20, including a constant current source connected in circuit in said reset means to establish substantially constant reset current to the respective transformer.

23. An inverter circuit as set forth in claim 20, wherein said reset means is connected to establish reset current in the respective transformer during substantially the same time period as the normal conduction period of the opposite semiconductor supplying current to the inverter output terminals.

24. An inverter circuit as set forth in claim 20, wherein said set means drives said drive transformers to said second flux level whose magnitude is less than the magnitude of said first flux level.

25. An inverter circuit having at least a first controllable semiconductor connected to supply an alternating voltage from DC terminals comprising, in combination;
a drive transformer having a secondary,
means including a decoupling unidirectional conducting device connecting said secondary to the control electrode of said first semiconductor,
turn-on means acting on said drive transformer to cause conduction through said decoupling device to said control electrode to turn on said first semiconductor,
turn-off means acting on said drive transformer to effectively terminate the turn-on signal on said secondary to terminate conduction of said first semiconductor,
and said decoupling device having a recovery time to achieve reverse blocking capability longer than that of said first semiconductor to thus prevent reverse bias being applied on the control electrode of said first semiconductor.

26. An inverter circuit as set forth in claim 25, wherein said decoupling device is a diode.

27. An inverter circuit as set forth in claim 25, wherein said decoupling device is a diode poled to conduct toward said control electrode.

28. An inverter circuit as set forth in claim 25, including reset means connected to apply a voltage to reset the flux in the core of said drive transformer to saturation in the opposite direction from turn-on with said decoupling device being thus reverse biased to prevent reverse bias being applied to the control electrode of said first semiconductor.

29. An inverter circuit as set forth in claim 25, wherein said decoupling device is included in a bias circuit connected to said control electrode.

30. An inverter circuit as set forth in claim 29, wherein said bias circuit includes a capacitor,
an impedance connected in parallel with said capacitor,
and said turn-on means acting to pass current through said paralleled capacitor and impedance to charge said capacitor.

31. An inverter circuit as set forth in claim 30, wherein said turn-off means utilizes the stored charge on said capacitor to apply a reverse bias voltage on said control electrode to terminate conduction of said first semiconductor.

32. An inverter circuit as set forth in claim 30, wherein said impedance is bias diode means poled to conduct in the same direction as said decoupling device.

* * * * *